W. D. & F. F. STOUT.
DIRECTION SIGNAL FOR MOTOR VEHICLES.
APPLICATION FILED MAY 28, 1917.
1,270,563.
Patented June 25, 1918.
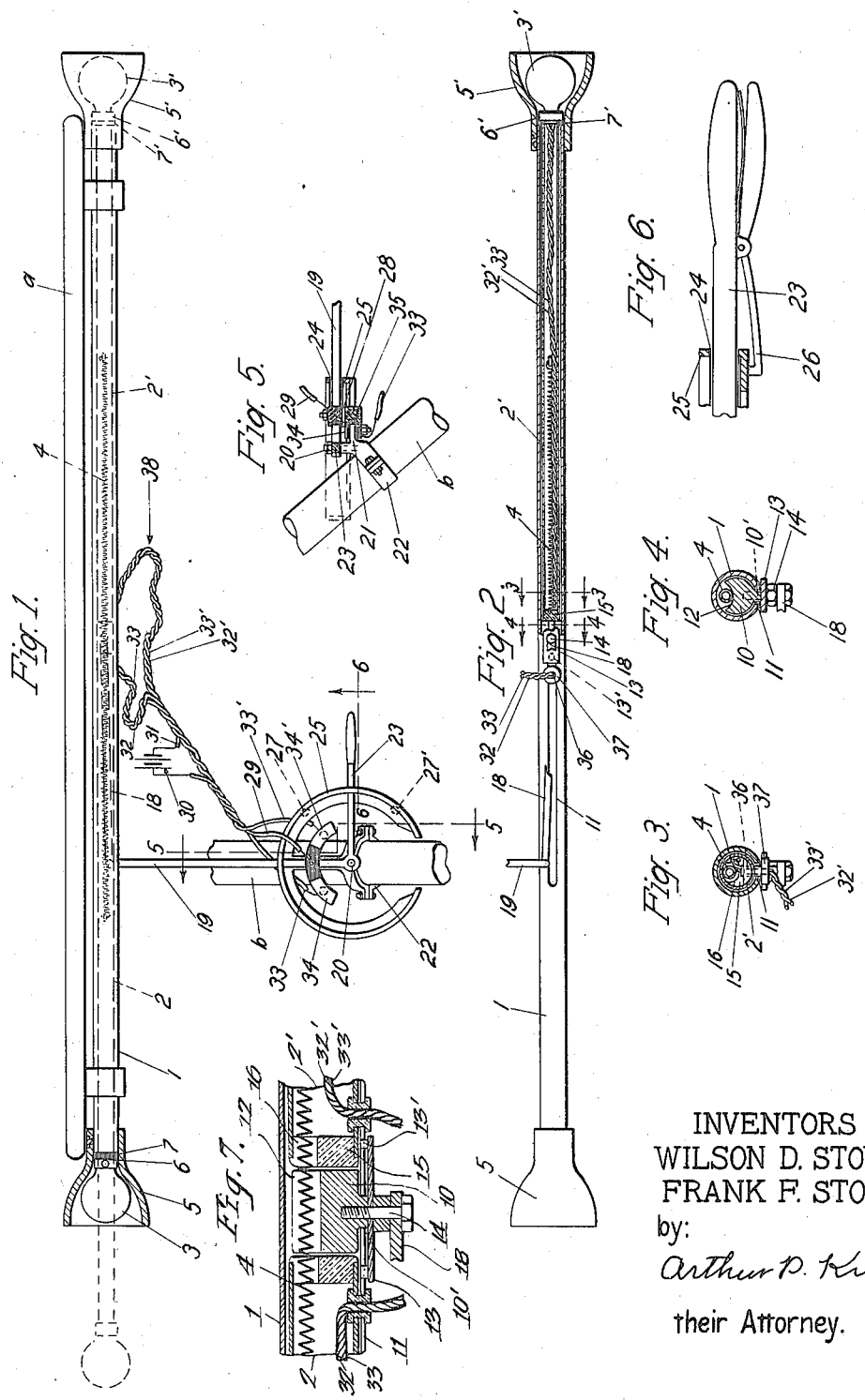
INVENTORS
WILSON D. STOUT
FRANK F. STOUT
by:
Arthur P. Knight
their Attorney.

UNITED STATES PATENT OFFICE.

WILSON D. STOUT AND FRANK F. STOUT, OF LOS ANGELES, CALIFORNIA.

DIRECTION-SIGNAL FOR MOTOR-VEHICLES.

1,270,563.  Specification of Letters Patent. Patented June 25, 1918.

Application filed May 28, 1917. Serial No. 171,430.

*To all whom it may concern:*

Be it known that we, WILSON D. STOUT and FRANK F. STOUT, citizens of the United States, residing at Los Angeles, in the county of Los Angeles and State of California, have invented a new and useful Direction-Signal for Motor-Vehicles, of which the following is a specification.

This invention relates to an attachment to motor vehicles, for the purpose of indicating the direction in which the vehicle is to turn.

The main object of this invention is to provide a device for this purpose of simple and cheap construction.

Another object of the invention is to provide a device of this kind in which electric lamps are used as signal means, and in which the connections to the lamps are made in a novel and improved manner.

The accompanying drawings illustrate an embodiment of our invention and referring thereto:

Figure 1 is a plan view of the device, partly in section, showing it in position behind the dashboard of an automobile.

Fig. 2 is an inverted plan view of a portion of the device, partly in section.

Fig. 3 is a section on line 3—3 in Fig. 2.

Fig. 4 is a section on line 4—4 in Fig. 2.

Fig. 5 is a section on line 5—5 in Fig. 1.

Fig. 6 is a section on line 6—6 in Fig. 1.

Fig. 7 is a partial longitudinal section of the device showing the operating member for the signals.

The indicating devices are mounted in a cylindrical tubular casing or guide tube 1, which may be attached in any suitable manner in the rear of the dashboard *a* of the vehicle as shown in Fig. 1, or in any convenient position. Two cylindrical signal-carrying members 2 and 2' are mounted to slide within the right and left portions respectively of the casing 1 and are provided with means for right and left signaling, for example electric lamps 3 and 3'. Members 2 and 2' are normally held toward each other by the single coiled spring 4 so as to be concealed within the casing 1 and when in this position the lamps 3 and 3' are also concealed and protected by the hemispheroidal shields 5 and 5', which are rigidly mounted on the casing 1. The members 2 and 2' are, however, held slightly apart by stops 6 and 6' at the outer ends thereof, which engage the outer ends of casing 1, said stops being preferably provided with rings 7 and 7' of resilient material so as to prevent shock upon the return movement of the signal means to normal position as hereinafter described. The signal-carrying members 2 and 2' are hollow and of sufficient inside diameter to contain the spring 4, which is attached to each of said members at a distance from the inner end thereof so as to provide sufficient length to give an effective pull, and said members also contain the electric wires for the lamps 3 and 3'.

Within the portion of the casing 1 between the two signal-carrying members is mounted an operating member 10, which is adapted to slide in either direction in said casing so as to engage one or the other of said members and to move it against the action of the spring 4 so that the corresponding signal is brought into exposed or signaling position. Said operating member is provided with a guiding lug or portion 10' adapted to slide in a longitudinal slot 11 in the casing 1, and with a recess or opening 12 to allow free movement of the spring 4. Member 10 is further guided by means of a plate 13 mounted thereon by bolt 14, said plate having lugs 13' engaging in slot 11. To prevent shock in the operating movement, members 2 and 2' are preferably provided at their inner ends with end members 15 of resilient material, said end members being cut away as indicated at 16 to permit passage of spring 4 therethrough.

Bolt 14 is connected by a link 18 to the forward end of an arm 19, which is pivoted at 20 on a suitable supporting means 21 mounted, for example, by means of a split ring 22 on the steering post *b* of the vehicle. Arm 19 is provided with a handle 23, said arm and said handle being guided in a slot 24 in a ring 25 mounted on supporting means 21, so that handle 23 may be moved so as to swing arm 19 to the right or left. Handle 23 may be provided with a spring catch 26 engaging in holes 27 and 27' in ring 25, for holding the device in either signaling position.

The electric circuits for the signal lamps 3 and 3' are as follows:

Arm 19 is provided with an insulated contact plate 28, from which a wire 29 leads to a source of current, for example to storage battery 30, from which a wire 31 leads to the branch wires 32 and 32' connected to the respective lamps 3 and 3'. Said lamps are also connected by wires 33 and 33' respectively to corresponding insulated contact segments 34 and 34', rigidly mounted on the supporting means 21 so that a certain one of said contact segments will make contact with contact plate 28 when arm 19 is swung to one side or the other from normal position. When in normal position, contact plate 28 rests on an insulating segment 35 between segments 34 and 34'. The two wires leading to either of the lamps may be twisted together and passed through the opening 36 in a hollow stud or bolt 37 extending through the slot 11 and screwing into the corresponding member 2 or 2' near the inner end thereof, said hollow stud thus serving as an entrance for the wires and also as a guide for the signal-carrying member. Since this bolt 37 moves with the signal-carrying member, it is not necessary to have any slack wire within the casing, the required slack being provided in the portion of the wire outside the casing, as indicated at 38.

The operation of this device is as follows:

Assuming that the driver wishes to signal that he is about to turn to the left, he moves the handle 23 forward so as to move the arm 19 to the left, which operates through link 18 to move operating member 10 to the left. Member 10 engages end member 15 on the signal-carrying member 2 and pushes said member 2 out so that the signal lamp 3 on the right side of the vehicle is moved out to exposed or signaling position. At the same time contact plate 28 is brought into contact with contact segment 34, whereby a circuit is closed from said contact segment through wire 33 to signal lamp 3, thence by wires 32 and 31 to the storage battery 30, and thence by wire 29 back to contact plate 28. Lamp 3 is thus illuminated and gives the desired signal, which is visible both during day and at night.

If the operator desires to keep the device in signaling position, he may do so by bringing the spring catch 26 into engagement with the hole 27, which will hold it in that position until the spring catch is released. On such release of the spring catch the tension spring 4 draws the sliding tube, and the signal lamp carried thereby, inwardly, such inward movement of the tube and lamps being arrested by resilient means 7 or 7' so as to produce a cushion action relieving the signal lamp from jar. The impact of member 10, in outward movement of the tube, is cushioned by means 15.

What we claim is:

1. A direction signal for vehicles comprising a cylindrical tubular casing extending transversely to the vehicle and provided with a longitudinal slot, two tubes mounted to slide in the respective end portions of said casing, electric signal lamps mounted on the outer ends of the respective sliding tubes, flexible electric conductors connected to said lamps and extending longitudinally in the respective sliding tubes and through the slot in said casing and having sufficient slack outside the casing to provide for the motion of the tubes, an operating member mounted to slide in said casing between the said sliding tubes and adapted to engage either of said sliding tubes to move the same outwardly while leaving the other sliding tube stationary, means extending through said slot in the casing and connected to said operating member to move the same in either direction, and a tension spring connecting said sliding tubes to draw both of them inwardly.

2. A direction signal for vehicles comprising a cylindrical tubular casing extending transversely to the vehicle and provided with a longitudinal slot, two tubes mounted to slide in the respective end portions of said casing, electric signal lamps mounted on the outer ends of the respective sliding tubes, each of said sliding tubes having a hollow stud extending through said slot in the casing to hold the tube from turning, flexible electric conductors connected to said lamps and extending longitudinally in the respective sliding tubes and through the respective hollow studs and having sufficient slack outside the casing to provide for the motion of the tubes, an operating member mounted to slide in said casing between said sliding tubes and adapted to engage either of said sliding tubes to move the same outwardly without moving the other of said sliding tubes, means extending through said slot in the casing and connected to said operating member to move the same in either direction, and a tension spring connecting said sliding tubes to draw both of them inwardly.

3. A direction signal for vehicles comprising a cylindrical tubular casing extending transversely to the vehicle and provided with a longitudinal slot, two tubes mounted to slide in the respective end portions of said casing, electric signal lamps mounted on the outer ends of the respective sliding tubes, flexible electric conductors connected to said lamps and extending longitudinally in the respective sliding tubes and through said slot in the casing, an operating member mounted to slide in said casing between said sliding tubes and adapted to engage either of said sliding tubes to move the same outwardly, and having operating means extending through said slot in the casing, for moving said operating member in either direction to push either sliding tube outwardly without moving the other sliding tube, a tension spring connecting said sliding tubes to draw both of them inwardly, and resilient means on the inner end of each of said sliding tubes for engaging said operating member to cushion the impact on the said sliding tubes in outward movement thereof.

4. A direction signal for vehicles comprising a cylindrical tubular casing extending transversely to the vehicle and provided with a longitudinal slot, two tubes mounted to slide in the respective end portions of said casing, electric lamps mounted on the outer ends of the respective sliding tubes, flexible electric conductors connected to said lamps and extending longitudinally in the respective sliding tubes and through said slot in the casing, an operating member mounted to slide in said casing between said sliding tubes and adapted to engage either of said sliding tubes to move the same outwardly without moving the other of said sliding tubes, operating means extending through said slot in the casing and connected to said slide, manually operated means connected to said operating means to move either of said sliding tubes outwardly, so as to bring the corresponding signal lamp to signaling position, a manually controlled spring catch adapted to hold said signal lamp in such signaling position, a tension spring connecting said sliding tubes to draw both of them inwardly and resilient stop means for each of said sliding tubes for arresting the inward movement thereof, by a cushion action, when either of the said sliding tubes is drawn inwardly by said tension spring on release of said catch.

In testimony whereof we have hereunto set our hands, at Los Angeles, California, this 21st day of May, 1917.

WILSON D. STOUT.
FRANK F. STOUT.